April 26, 1955  C. L. VERNON  2,707,130
MOTIVATING APPARATUS FOR PORTABLE IRRIGATION SYSTEMS
Filed Oct. 13, 1952  2 Sheets-Sheet 1
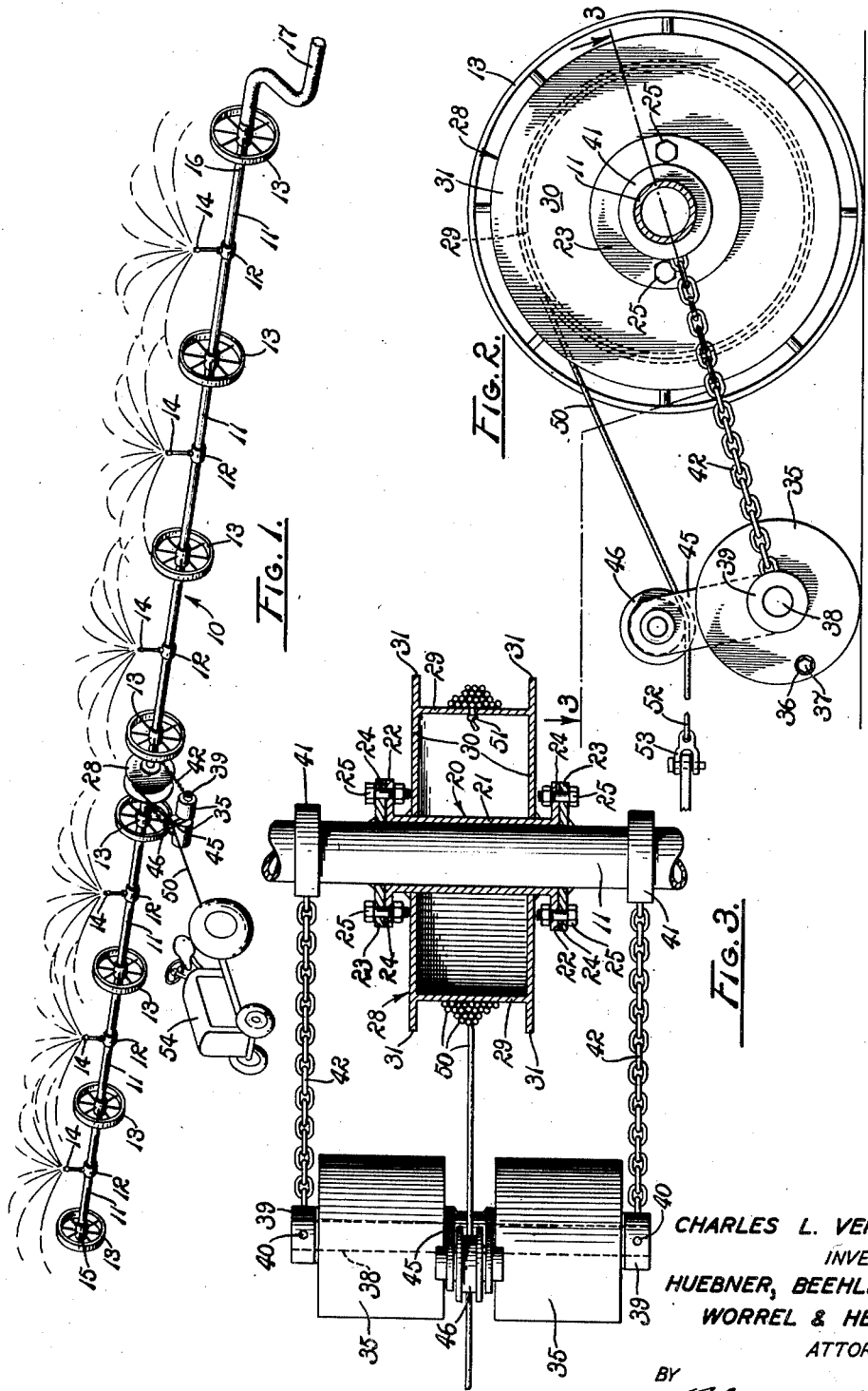
CHARLES L. VERNON
INVENTOR
HUEBNER, BEEHLER,
WORREL & HERZIG
ATTORNEYS
BY April 26, 1955 C. L. VERNON 2,707,130
MOTIVATING APPARATUS FOR PORTABLE IRRIGATION SYSTEMS
Filed Oct. 13, 1952 2 Sheets-Sheet 2

CHARLES L. VERNON
INVENTOR

HUEBNER, BEEHLER,
WORREL & HERZIG
ATTORNEYS

United States Patent Office 2,707,130
Patented Apr. 26, 1955

2,707,130

MOTIVATING APPARATUS FOR PORTABLE IRRIGATION SYSTEMS

Charles L. Vernon, Fresno, Calif.

Application October 13, 1952, Serial No. 314,441

9 Claims. (Cl. 299—47)

The present invention relates to portable irrigation systems and more particularly to a motivating apparatus therefor.

It has become popular, particularly in uneven farm lands, to irrigate by means of portable spraying systems. The systems usually consist of a plurality of lengths of tubular conduit coupled in end to end relation and supported on wheels mounted concentrically thereon. Sprinklers are mounted on the conduit and water under high pressure is supplied to the conduit from any suitable source thereof. When such a system has completed the irrigation of a strip in a field, the conduit is rolled laterally on its support wheels to an adjacent strip and the irrigating resumed.

Such systems are frequently quite long, in many instances approaching a half mile or so in length. The movement of such systems over uneven terrain is thus of considerable difficulty. It is necessary that the support wheels be substantially equally rotated so that all portions of the conduit progresses evenly. Inasmuch as the conduit possesses a measure of torsional flexibility and is usually rotated from a single position, it is usually necessary to rotate the conduit from such position until the adjacent portions of the conduit slightly pass a new spraying area and then to reverse the rotation of the conduit to return the same to the operating position to compensate for torsional elasticity and substantially to align the entire length of the conduit.

The most popular means for rotating such conduit and its support wheels, has consisted of an elongated lever pivoted on the conduit and connected thereto by ratchet means whereby lever manipulation rotates the conduit in successive steps. While such means has proved economical, it is employed with considerable difficulty and when lengthy conduits are so motivated, not infrequently the power requirements are such as to require several attendants to manipulate the lever.

It has also been known to place a rotatable collar on such conduit and connect the collar to a tractor for the towing of the conduit. This procedure, however, has been quite generally unsatisfactory in that rotational movement is ineffectively imparted to the conduit and lateral stresses thereon frequently result in conduit misalignment and damage thereto.

Recently, a power driven unit has been developed, comprising the subject matter of United States Patent No. 2,582,416, which contains a driving engine mounted on a frame pivotally connected to the pipe and including means forming driving connection between the engine and the pipe support wheels. This unit is referred to simply to illustrate a recent structure resulting from recognition of the above described difficulties.

An object of the present invention is to provide an improved motivating apparatus for portable irrigation systems.

Another object is to provide such a motivating apparatus that is inexpensive to produce and permits the utilization of existing farm motivating means such as tractors, draft animals and the like.

Another object is to provide a motivating apparatus for portable irrigation systems which is durable in operation and obviates reliance on any self-contained driving engine.

Another object is to provide such a motivating apparatus conveniently adaptable to move irrigation systems of the character described in either lateral direction.

Further objects and advantages are to provide improved elements and arrangements thereof in a device of the character and for the purposes set forth that is inexpensive, easily installed, durable, suited to varied operational environments, and is fully effective in accomplishing its intended purposes.

Other objects and advantages will become apparent in the subsequent description in the specification.

Referring to the drawings:

Fig. 1 is a perspective view of an irrigation system of the character described equipped with a motivating apparatus embodying the principles of the present invention coupled to a tractor for motivating purposes.

Fig. 2 is a side elevation of the motivating apparatus of the present invention mounted on an irrigation pipe illustrated in transverse section.

Fig. 3 is a horizontal section taken on line 3—3 of Fig. 2.

Figure 4:
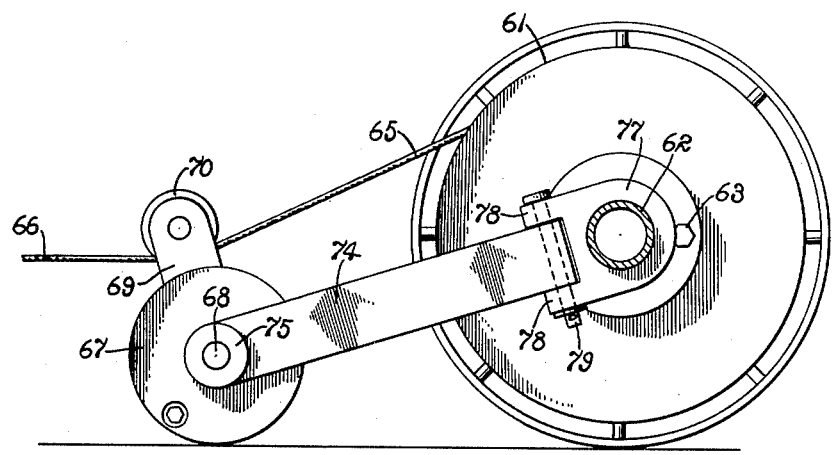
Fig. 4 is a side elevation of a second form of the invention.

Referring in greater detail to the drawings:

A conventional irrigation system is indicated generally at 10 including a plurality of lengths of conduit 11 connected in end to end relation for unitary movement by couplings 12 and supported on a plurality of wheels 13 of a substantially common diameter rigidly mounted concentrically on the conduit in axially spaced relation for unitary rotational movement therewith. The conduit 11 conveniently takes the form of lengths of aluminium pipe, steel tubing, or the like. The couplings are shown as side-outlet Ts which mount nozzles 14, of any desired form, for water distribution purposes. One end 15 of the aligned conduits 11 is plugged and the opposite end 16 is connected to any suitable source of irrigation water under pressure, not shown, by a flexible hose 17. It is obvious that water may be supplied to an end of the system 10, as described, or at any desired position or positions intermediate the ends as convenience suggests. The structure described to this point is well known and is referred to for the purpose of illustrating a known system with which the instant motivating apparatus is advantageously employed.

Referring to the first form of the invention shown in Figs. 1, 2 and 3, a spool 20 is freely rotatable on one of the conduits 11 substantially midway between the terminal ends of the system. The spool provides a cylindrical portion 21 rotatable on the conduit having radial flanges 22 at each of its ends. A pair of disks 23 circumscribe the conduit adjacent to each flange 22, preferably being welded thereto to maintain the spool in axial position on the conduit by engagement with the flanges. Aligned bores 24 are formed through both the flanges 22 and the disks 23 through which bolts 25 are passed to secure the spool non-rotatably on the conduit when it is desired to motivate the same. The bolts 25 are removable from the flanges and disks to permit the spool to rotate on the conduit. Other structures for releasably mounting the spool on the conduit for optional free rotation or rigid connection to the conduit will readily occur to anyone skilled in the art.

A drum of an overall diameter less than that of the wheels circumscribes the spool 20 having a hollow cylindrical portion 29 concentric to the spool and circular end members 30 concentrically secured, as by welding, symmetrically to the spool. The end members extend radially from the cylindrical portion of the drum and provide flanges 31 peripherally extended beyond the cylindrical portion. By insertion or removal of the bolts 25 from the bores 24, the spool and drum may be selectively rotatable with the conduit or freely rotatable thereon.

A pair of hollow cylindrical rollers 35 are each provided with an opening 36 to its interior whereby it may be filled with water or other fluid for ballast during use and plugged by a plug 37. Inasmuch as water is usually available, it is the material most frequently employed to weight the rollers but it is to be understood that any material, such as sand, gravel, pulverulent soil, or the like which flows sufficiently conveniently to be funneled into the roller through the opening 36 may be utilized. The rollers are rotatably mounted on a common axle 38 in axially spaced relation. A collar 39 is pinned at 40 to opposite ends of the axle outwardly adjacent to each roller. A ring 41 is loosely supported on the conduit at each side of the drum 28 with a chain 42 interconnecting each collar with its corresponding ring to maintain the rollers in substantial axial parallel relation to the conduit when in maximum spaced relation thereto.

A bifurcated arm 45 is rotatable on the axle 38 between the rollers 35 having an extended end rotatably mounting a sheave 46 in axial parallel relation to the axle. As shown in Fig. 2, the bifurcated arm is of such length that when it is upwardly extended, the sheave is appreciably below the uppermost periphery of the cylindrical portion of the drum. The spacing of the rollers actually permits the lowering of the sheave between the rollers, if desired.

A cable 50, or other flexible towing member, has a fixed end portion secured to the drum 28, as at 51, and is partially wound around the drum. The cable has a towing end portion 52 and is so wound about the drum that the towing end portion extends over the uppermost periphery of the drum in the direction of the rollers 35 and passes through the bifurcated arm 45 and under the sheave 46. A draft coupling 53 is attached to the forward terminal end of the cable whereby the cable may be easily attached to a suitable draft means 54, such as a tractor, as shown. Not only is the sheave 46 below the uppermost periphery of the drum 28 but it is preferably below an imaginary line, not shown, drawn from the coupling 53 tangentially to the uppermost periphery of the cylindrical portion 29 of the drum.

Operation

The operation of the first form of the invention is believed to be clearly apparent and is briefly summarized at this point. Assuming that the irrigation system 10 has been in operation for a period sufficient to accomplish the intended moistening of a strip of ground and it is desired laterally to move the system to an adjacent area requiring irrigation, the bolts 25 are removed from the bores 24 and the drum 28 manually rotated in a clockwise direction, as viewed in Fig. 2, to wind the cable 50 thereon. With the cable so wound, the bolts 25 are returned to position to lock the drum, spool 20, and conduit 11 together for unitary rotational movement and in driving relation to the wheels 13. The extended end of the towing portion 52 of the cable is extended under the sheave 46 and connected to the coupling 53 of the tractor 54 or to any other suitable draft means. Upon drawing on the cable in the direction in which the system is to be moved, the cable tensions and raises the arm 45 into an upwardly extended position. Continued pull, on the cable, results in the imposition of a tangential force on the periphery of the drum 28 tending to rotate the same in a counterclockwise direction, as viewed in Fig. 2. As the cable is pulled from the drum, it thus rotates the same and correspondingly rotates the wheels 13 with which it has driving connection. The significance of the sheave 46, or other cable depressing means, is worthy of note. By holding the cable downwardly, as shown, the draft of the tractor is translated into rotational movement of the conduit 11 and wheels 13 on which it is mounted. Without the sheave or similar cable depressing means, the simple drawing on a cable wound on a drum of the character described, is found to exercise a greater towing effect than rotational effect which results in sliding movement of the wheels adjacent to the drum and such serious misalignment of the conduits 11 as to cause damage thereto.

When it is desired to move the system 10 in the opposite lateral direction, the rollers are moved to a position laterally extended from the conduit 11 in the opposite direction. For convenience in moving the rollers 35 to the opposite side of the conduit 11, the fluid, not shown, is preferably emptied therefrom by removal of the plugs 37. So lightened, the rollers are conveniently trundled to the opposite side of the conduit and again filled with fluid, to weight the same, whereupon they are again arranged in substantially parallel relation to the drum 28 and the chains connected to the rings 41. The bolts 25 are removed and the cable 50 wound on the drum in the opposite direction so that the towing portion 52 thereof extends from the uppermost periphery of the drum in the new direction of the rollers therefrom and is threaded through the arm 45 and under the sheave 46 for connection to the tractor 54. Inasmuch as the conduit 11 is rotated for movement of the system, it will be obvious that the supply of water to the conduit through the hose 17 is preferably interrupted during movement of the system.

Second form

Figure 5:
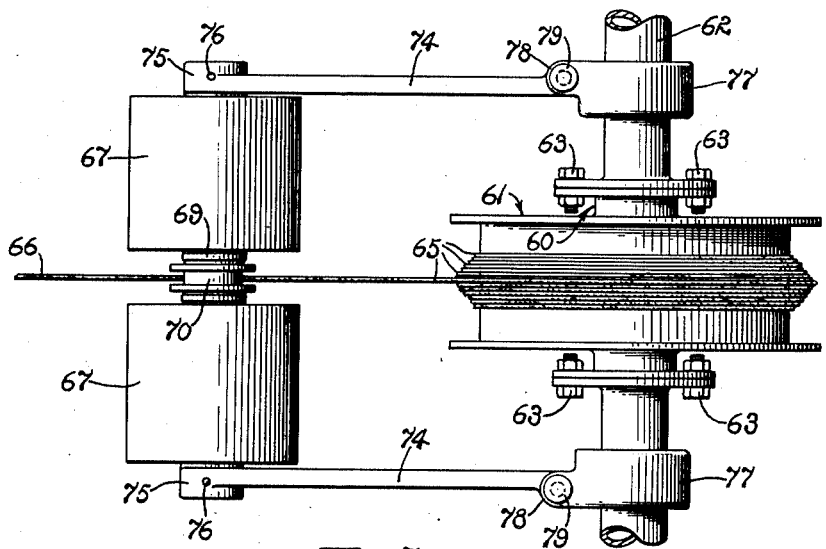
Fig. 5 is a plan view of the second form of the invention shown in Fig. 4.

The second form of the invention, shown in Figs. 4 and 5, is similar to that already described and utilizes a spool 60, similar to the spool 20, for rotatably mounting a drum 61, similar to the drum 27, on a conduit 62, similar to the conduit 11. Bolts 63 releasably interconnect the conduit and drum for unitary rotational movement in a manner similar to the bolts 25.

A cable 65 is partially wound on the drum 61 in a manner described for the cable 50 and provides a towing portion 66. Rollers 67 similar to the rollers 35 are also utilized and provide an axle 68 from which an arm 69 pivotally extends. A sheave 70, or other cable depressing means, is mounted on the extended end of the arm 69 at an elevation below the uppermost periphery of the drum.

The second form of the invention differs from the first form, however, in the substitution of a pair of links 74 for the chains 42. Each link 74 has an enlarged boss at its forward end through which the terminal ends of the axle 68 extend and are secured thereto by pins 76. The links 74 are substantially parallel, being universally connected to the conduit 62 by means of a pair of rings 77 freely rotatable on the conduit 62, one each side of the drum 61. Each ring is formed with a pair of elevationally spaced lugs 78. The rearward end of each of the arms 69 is located between a pair of lugs and maintained pivotally therebetween by a pintle 79 passing through each pair of lugs and the rearward end of the arm therebetween.

The second form of the invention operates in substantially the manner described for the first form except that the links 74, being substantially rigid, interconnect the axle 68 and the conduit 62 in predetermined spaced parallel relation.

The links 74 being pivotally connected to the rings 77, permit limited relative axial movement between the drum 61 and the rollers 67 to accommodate minor departures of the cable from right angular relation to the conduit during earth traversing movement. This limited movement facilitates automatic alignment of the sheave with the tractor as the cable is tensioned. The chains 42 with their collars 39 and brackets 41 serve to interconnect the axle 38 and conduit 11 in limited spaced relation. The common significant attribute of the arms and the chains is that they serve to hold the roller in a position adjacent to the drum so that the cable is depressed adjacent thereto for the described more effective rotation of the conduit. The links are capable of pushing the roller 67 over uneven terrain but normally the tendency of the downwardly directed towing portion of the cable is sufficient to cause the roller to stay in approximately maximum spaced relation to the conduit even when the chains are utilized.

The motivating apparatus described are economical to produce, easily installed by even unskilled labor, successfully rotate the wheels 13 in corresponding rotational movement so that the conduit supported thereby is carried over the earth at substantially the same rate so as to maintain desired alignment. Any means for pulling on the cable with sufficient power to rotate the drum 28 when it is releasably locked to the conduit is adequate to move the system and thus farmers can employ existing motivating means such as tractors, draft animals, or even manual power for the purpose. Whenever the extent of cable wound on the drums is inadequate to achieve the desired distance of earth traversing movement for the system 10, the bolts 25, or 63, are removed and the cable rewound by reverse rotation of the drum on its spool in preparation of a successive moving operation after again locking the drum to its spool.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as Having described my invention what I claim as new and desire to secure by Letters Patent is:

1. A motivating apparatus for an elongated pipe comprising wheels concentrically mounted on the pipe for support thereof, a drum mounted concentrically on the pipe, a flexible towing member partially wound about the drum and laterally extended therefrom, means engaged with the towing member in laterally spaced relation to the drum for depressing the towing member downwardly when a force is applied to the towing member in said lateral direction to motivate the wheels, and means interconnecting the towing member engaging means and the pipe in limited spaced relation.

2. A motivating apparatus for an elongated pipe mounted axially in support wheels for earth traversing movement comprising a drum mounted concentrically on the pipe, a flexible towing member partially wound about the drum and laterally extended therefrom, a sheave in spaced relation to the drum receiving the towing member in threaded relation therethrough, and weight means in rolling earth engagement connected to the sheave and depressing the sheave and the towing member below the uppermost periphery of the drum in spaced relation to the drum during earth traversing movement of the pipe upon tensioning of the towing member.

3. A motivating apparatus for an irrigation pipe supported on wheels comprising a flanged drum mounted concentrically on the pipe, a substantially cylindrical roller rested on the earth in substantially axially parallel spaced relation to the drum, means interconnecting the pipe and the roller for independent rotary motion relative to said means and limiting the maximum spaced relation of the drum and roller, a sheave mounted above the roller and below the uppermost periphery of the drum, a flexible towing member secured at one end to the drum and wound thereabout having a free end extended from the uppermost periphery of the drum through the sheave, means releasably interconnecting the drum and the support wheels for unitary rotational movement and weighting means associated with said roller for depressing said towing member intermediate the ends thereof when a pulling force is applied to the free end of said towing member.

4. In an irrigation system having an elongated pipe, and support wheels of a substantially common diameter mounted in axially spaced relation concentrically on the pipe for unitary rotational movement therewith, the combination of a drum of a diameter less than the diameter of the wheels rotatably mounted on the pipe, means releasably interconnecting the drum and pipe for unitary rotational movement, a weight in rolling earth engagement in laterally spaced substantially parallel relation to the drum, an axle for the weight, means interconnecting the axle at opposite ends of the weight and the pipe and limiting the spaced relation of the axle to the pipe to a predetermined maximum, an arm upwardly extended from the axle, a sheave mounted on the upper end of the arm, and a cable partially wound about the drum having a towing end extended from the uppermost portion of the periphery of the drum through the sheave.

5. A motivating apparatus, for an irrigation pipe having support wheels of a substantially common diameter mounted concentrically thereon and adapted for connection to a draft means having an elevated draft coupling, comprising a drum of a diameter less than the diameter of the wheels rotatably mounted on the pipe, means releasably interconnecting the drum and pipe for unitary rotational movement, a weight supported in rolling earth engagement in laterally spaced relation to the drum, an axle for the weight, an arm upwardly extended from the axle, a cable partially wound about the drum having a towing end extended from the uppermost portion of the periphery of the drum connected to the draft coupling of the draft means, and cable depressing means mounted on the arm above the cable and at an elevation below an imaginary line interconnecting said uppermost portion of the periphery of the drum and said draft coupling.

6. In an irrigation system having an elongated pipe, and support wheels of a substantially common diameter rigidly mounted in axially spaced relation concentrically on the pipe, the combination of a substantially cylindrical drum of a diameter less than the diameter of the wheels rotatably mounted concentrically on the pipe, means releasably interconnecting the drum and the pipe for unitary rotational movement, a pair of links rotatably mounted on the pipe on opposite sides of the drum and laterally extended therefrom, an axle interconnecting the extended ends of the links in substantially parallel relation to the drum, a pair of axially aligned hollow substantially cylindrical rollers rotatably mounted on the axle, an arm rotatably mounted on the axles between the rollers, a cable having an end connected to the drum and an opposite towing end, the cable being partially wound about the drum with the towing end thereof passed over the uppermost periphery of the drum in a direction toward the roller, the towing end of the cable being laterally extended from the drum past the arm, and cable depressing means mounted on the arm in cable engagement and constraining the cable to an elevation below the uppermost periphery of the drum.

7. In an irrigation system having an elongated pipe, and support wheels of a substantially common diameter rigidly mounted in axially spaced relation concentrically on the pipe, the combination of a substantially cylindrical drum of a diameter less than the diameter of the wheels rotatably mounted concentrically on the pipe, means releasably interconnecting the drum and the pipe for unitary rotational movement, a collar rotatably mounted on the pipe at each side of the drum, a flexible tension member connected to each collar and laterally extended from the pipe, a hollow substantially cylindrical roller rotatably mounted between the extended ends of the flexible tension member in substantially parallel relation to the drum, an arm mounted for pivotal movement concentric of the roller, a cable having an end connected to the drum and an opposite towing end, the cable being partially wound about the drum with the towing end thereof passed over the uppermost periphery of the drum in a direction toward the roller, the towing end of the cable being laterally extended from the drum toward the arm, and cable depressing means mounted on the arm above the cable and at an elevation below the uppermost periphery of the drum.

8. In an irrigation system having an elongated irrigation pipe, and support wheels of a substantially common diameter fixedly mounted in axially spaced relation concentrically on the pipe, motivating means for the system comprising a spool rotatably mounted concentrically on the pipe having circular flanges at opposite ends thereof, a flanged drum rigidly mounted on the spool between the flanges thereof and having an overall diameter less than the diameter of the support wheels, a disk rigidly mounted on the pipe adjacent to each of the flanges of the spool, a bolt releasably passed through the flanges of the spool and the disk releasably interconnecting the same for unitary rotational movement with the pipe and support wheels, a pair of arms rotatably mounted on the pipe on opposite sides of the spool and laterally extended therefrom in substantially parallel relation, a hollow substantially cylindrical roller rotatably mounted between the extended ends of the arms in rolling earth engagement, an arm pivotally mounted concentrically of the roller and upwardly extended therefrom, a sheave mounted on the extended end of the arm below the uppermost portion of the periphery of the drum, and a cable having an end secured to the drum partially wound about the drum and having a towing end extended from the uppermost periphery of the drum through the sheave and laterally from the pipe.

9. In an irrigation system having an elongated irrigation pipe, and support wheels of a substantially common diameter rigidly mounted in axially spaced relation concentrically on the pipe, motivating means for the system comprising a flanged spool rotatably mounted concentrically on the pipe, a flanged drum rigidly mounted on the spool between the flanges thereof and having an overall diameter less than the diameter of the support wheels, a circular disk mounted rigidly on the pipe adjacent to the flanges of the spool, a bolt releasably passed through the flanges of the spool and the disk releasably interconnecting the same for unitary rotational movement with the pipe and support wheels, a collar rotatably mounted on the pipe at opposite sides of the spool, a chain connected to each collar and laterally extended from the pipe, an axle interconnecting the extended ends of the chains in substantially parallel relation to the pipe, a pair of hollow substantially cylindrical rollers rotatably mounted concentrically on the axle in rolling earth engagement, fluid releasably contained in the roller to weight the same, an arm rotatably mounted on the axle between the rollers and upwardly extended therefrom, a sheave mounted on the extended end of the arm below the uppermost portion of the periphery of the drum, and a cable having an end secured to the drum partially wound about the drum and having a towing end extended from the uppermost periphery of the drum through the sheave and laterally from the pipe.

References Cited in the file of this patent

UNITED STATES PATENTS

| | | |
|---|---|---|
| 21,449 | Schuyler | Sept. 7, 1858 |
| 2,516,711 | Mansur | July 25, 1950 |
| 2,582,416 | Cornelius | Jan. 15, 1952 |